(12) United States Patent
Crichton

(10) Patent No.: US 10,899,025 B2
(45) Date of Patent: Jan. 26, 2021

(54) FOOD SLOTTING DEVICE AND METHOD

(71) Applicant: Daniel John Crichton, Burlington (CA)

(72) Inventor: Daniel John Crichton, Burlington (CA)

( * ) Notice: Subject to any disclaimer, the term of this patent is extended or adjusted under 35 U.S.C. 154(b) by 0 days.

(21) Appl. No.: 15/912,414

(22) Filed: Mar. 5, 2018

(65) Prior Publication Data
US 2018/0194018 A1    Jul. 12, 2018

Related U.S. Application Data

(63) Continuation-in-part of application No. 14/673,875, filed on Mar. 31, 2015, now abandoned.

(60) Provisional application No. 61/973,843, filed on Apr. 2, 2014.

(51) Int. Cl.
*B26B 3/04* (2006.01)
*B26D 3/08* (2006.01)
*A47J 37/07* (2006.01)

(52) U.S. Cl.
CPC .......... *B26B 3/04* (2013.01); *A47J 37/0786* (2013.01); *B26D 3/08* (2013.01); *B26D 2210/02* (2013.01)

(58) Field of Classification Search
CPC .... A47J 37/0786; B26B 3/04; B26D 2210/02; B26D 3/08
USPC .......................................................... 30/880
See application file for complete search history.

(56) References Cited

U.S. PATENT DOCUMENTS

| | | | | |
|---|---|---|---|---|
| 1,636,583 A | * | 7/1927 | Ahl | B26B 3/04 30/128 |
| 1,672,045 A | * | 6/1928 | Sweeney | B26B 3/04 30/305 |
| 2,502,157 A | * | 3/1950 | Klejna | B26D 3/185 30/303 |
| 4,976,029 A | * | 12/1990 | Kennedy | A47J 43/28 30/114 |
| 5,456,010 A | * | 10/1995 | Bryda | B26B 3/04 30/286 |
| 5,579,582 A | * | 12/1996 | Carlson | A21C 11/106 30/299 |
| 5,692,424 A | * | 12/1997 | Wallace | A47J 36/00 83/167 |
| D400,766 S | * | 11/1998 | Ferguson | D7/673 |

(Continued)

*Primary Examiner* — Ghassem Alie
(74) *Attorney, Agent, or Firm* — Holbeche Law; Kevin Edward Holbeche

(57) ABSTRACT

A FOOD SLOTTING DEVICE includes a holding unit, an assembly of slicing blades arranged in a perpendicular fashion, and an affixed cover piece, for creating an elongated cross-hatch pattern of perpendicular slots by partially slicing into one or more surface areas on the body of a food product, generally of an elongated nature, such as a hot dog, wiener, frankfurter, sausage or the like through the directional application of force, such as the METHOD of carrying out such partial slicing denotes. Thereafter the partially sliced food product is easily removed from the slicing blades assembly of the FOOD SLOTTING DEVICE prior to cooking, grilling, or further processing. The slots prevent bursting by permitting gases generated by the cooking process to escape, allowing penetration of the heat to the center of the food product providing quicker cooking thereof, thereby providing for a more palatable and pleasant looking food product.

19 Claims, 4 Drawing Sheets

(56) References Cited

U.S. PATENT DOCUMENTS

| | | | | |
|---|---|---|---|---|
| 5,848,470 A * | 12/1998 | Anderson | ............... | A21C 11/00 30/277 |
| 5,946,809 A * | 9/1999 | Bright | ....................... | B26F 1/32 30/305 |
| D416,177 S * | 11/1999 | Hood | ........................... | D7/673 |
| 5,979,281 A * | 11/1999 | Caesar | .................... | B26D 1/09 30/305 |
| 6,276,918 B1 * | 8/2001 | Slaughter | ............ | A21C 11/106 249/DIG. 1 |
| D634,590 S * | 3/2011 | Ferguson | ....................... | D7/673 |
| 7,992,476 B2 * | 8/2011 | Kaposi | ................... | B26B 5/008 30/124 |
| 8,574,043 B2 * | 11/2013 | Zean | ...................... | A22C 9/008 452/144 |
| 8,695,220 B2 * | 4/2014 | Rhoads | ................... | A47J 43/20 30/114 |
| 8,857,325 B2 * | 10/2014 | Brown | ................... | A21C 15/04 99/537 |
| 9,073,229 B2 * | 7/2015 | Zaretsky | ................ | B26D 3/185 |
| 2007/0022611 A1 * | 2/2007 | Verbiest | ................ | A21C 15/04 30/114 |
| 2008/0209737 A1 * | 9/2008 | Storms | ...................... | B26B 3/04 30/114 |
| 2008/0229938 A1 * | 9/2008 | Hutto | ................... | A47J 9/005 99/537 |
| 2011/0283548 A1 * | 11/2011 | White | .................. | A21C 11/106 30/301 |

* cited by examiner

FOOD SLOTTING DEVICE AND METHOD

CROSS-REFERENCE TO RELATED APPLICATIONS

The application is a continuation in part of U.S. patent application Ser. No. 14/673,875 (filed on Mar. 31, 2015) entitled FOOD SLOTTING DEVICE AND METHOD and currently pending, which claims the benefit of priority to Provisional U.S. Patent Application Ser. No. 61/973,843 (filed on Apr. 2, 2014). The entirety of each and both of these applications is hereby incorporated by reference herein.

BACKGROUND

It is desirable to provide a simple to use device for creating slots by partially slicing into food products that are generally elongated in nature, more particularly hot dogs, sausages and similar, without external casing, or encased in synthetic or natural membrane type casings. It is also desirable to make said slots in one or multiple sides of said food products in a crosshatch pattern, with the cuts placed perpendicular to one another, evenly spaced out along the full longitudinal area of the food product, prior to the cooking, grilling, or further processing of the food product. As an example relating to hot dogs, wieners, frankfurters, sausages or the like, in the cooking or grilling process the cook will make a plurality of angular slices along the individual food item prior to placing the food item on the grill so as to prevent the food item from burning, drying out, becoming overcooked, or to permit the escape of gases generated by the cooking or grilling process in order to prevent bursting, and said slices also allow more rapid penetration of the heat to the center of the food product to provide more rapid cooking thereof. While such slices may be made in a manual manner, using a knife by hand for example, or by a complicated processing machine, it is desirable to provide for a simple to use, cost effective, time efficient, and portable device in order to make, as desired, partial cuts to a food product, such as a hot dog, wiener, frankfurter, sausage or the like.

Some prior art devices (for example, closing "clamshell" type devices) for slicing food items may have applied force to hot dogs in a manner and/or direction which may have compressed one elongate side of the hot dog during the cutting process, distributed unequal force to the other elongate side, and/or creating a significant risk of rupture in the surface of the hot dog. Such prior art devices may also have caused the hot dogs to roll, or may have dislodged the hot dog, from its initial position during the process, resulting in uneven cuts. There may be a need for a device and/or method, according to the invention, wherein a force can be readily applied by cutting blades contacting the surface of a hot dog in a downward/vertical motion, normal to a flat stable underlying surface upon which the hot dog may be placed to support the hot dog, with the underlying surface effectively providing an equal opposing upward/vertical force. There may be a need for a device and/or method, according to the invention, which can be readily used to provide an equal distribution of force to both elongate sides of the hot dog and/or, otherwise, reduces the hot dog's risk of ruptures and/or opportunity for sideways movement during the process.

Some prior art devices (for example, "clamshell" type devices with a fixed closed position) for slicing food items may have been ineffective in cutting hot dogs of varying thicknesses, and/or may have been completely unable to make any cut whatsoever in hot dogs smaller than a certain thickness. There may be a need for a device and/or method, according to the invention, wherein a maximum depth of cuts may be consistently controlled by a backstop member and/or which enables a user to create equal cuts of a maximum depth in all thicknesses of hot dogs.

BRIEF SUMMARY OF THE INVENTION

This invention relates to a FOOD SLOTTING DEVICE for creating perpendicular slots by partially slicing into a food product of a generally elongated nature, such as a hot dog, wiener, frankfurter, sausage or the like, and to a method of carrying out such partial slicing.

A simple to use, cost effective, time efficient, and easily portable device has been discovered for making, in a simple and effective manner, perpendicular slots by partially slicing into the body of a generally elongated food product, such as a hot dog, wiener, frankfurter, sausage or the like. The FOOD SLOTTING DEVICE typically comprises of a plurality of slicing blades each of a defined height as to affect the desired depth of slot sliced into the body of the food product assembled in a slicing blades assembly of defined relation. The slicing blade height is designed to slice into the food product not greater than approximately fifty percent, or preferably in between fifty percent and ten percent of the relative thickness of the food product when the device is fully applied with directional force to the food product, so that the food product is then easily removed from the FOOD SLOTTING DEVICE for cooking or further processing. The slicing blades in the slicing blades assembly are assembled in a perpendicular relation to one another, forming an elongated equally spaced cross-hatch pattern, housed within a holding unit comprised of plastic or similarly rigid material, the slicing blades assembly being secured in place within the holding unit by a cover piece comprised of a generally similar material to that of the holding unit, affixed in place to the holding unit by friction and/or the use of an adhesive.

The FOOD SLOTTING DEVICE may be made entirely of plastic, metal, or any combination of similarly rigid materials as mentioned above, for example a plastic holding unit with metal slicing blades assembly, or a metal holding unit with metal slicing blades assembly. The slicing blades assembly made of metal, plastic or a similarly rigid material slicing blades may be affixed within the holding unit by adhesive and/or friction, welded, molded in position, or bent from a portion of the body. The FOOD SLOTTING DEVICE is cost effective and simple to use in order to create slots by partially slicing into a food product, in a rapid and efficient manner so that the food product may then be cooked in a more consistent manner without uncontrollable bursting of the outer casing or skin if it exists, by permitting the escape of gases generated by the cooking process, and said slots also allow more rapid penetration of the heat to the center of the food product to provide more rapid cooking thereof, thereby providing for a more palatable and pleasant looking food product such as a hot dog, wiener, frankfurter, sausage or the like upon cooking or grilling.

The method of the invention comprises placing a generally elongated food product to be partially sliced, onto a flat surface, then with the slicing blades assembly component of the FOOD SLOTTING DEVICE contacting the surface of the food product, applying directional force such as downward, upwards, sideways or horizontal for example, as desired directly onto the food product, with a FOOD SLOTTING DEVICE comprising of a holding unit section and housing an affixed assembly of perpendicular slicing blades extending a sufficient distance to effect the partial slots in the number and depth as desired by pressing the assembled FOOD SLOTTING DEVICE in the desired direction upon one or multiple longitudinal sides of the food product, so as to cause the slicing blades to penetrate the food product to a desired depth creating a cross-hatch pattern of slots on the food product, and thereafter easily remove the partially sliced food product from the slicing blades of the FOOD SLOTTING DEVICE prior to cooking, grilling, or further processing.

DETAILED DESCRIPTION OF THE PREFERRED EMBODIMENTS

The invention will be described for the purposes of illustration only in connection with certain preferred embodiments; however, it is recognized that those people skilled in the art may make various changes, modifications, additions and improvements to the preferred and illustrated embodiment, all falling within the spirit and scope of the invention.

Figure 1:
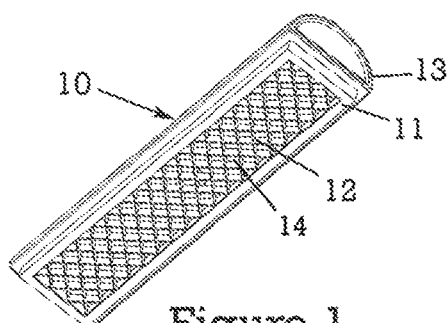
FIG. 1 is a bottom perspective view of the completely assembled FOOD SLOTTING DEVICE constructed in accordance with the teachings of the instant invention.

Turning now to the drawings, in which like reference characters indicate corresponding elements, attention is first directed to FIG. 1 in which is seen a FOOD SLOTTING DEVICE 10 from a bottom perspective view of the completely assembled FOOD SLOTTING DEVICE 10 constructed in accordance with the teachings of the instant invention, generally designated by the reference character 10, with the cover piece 11 affixed in place to the holding unit 13 through the utilization of adhesive and friction, securing the slicing blades assembly 12 within the holding unit 13. As illustrated, the slicing blades assembly 12 is positioned to affect, by slicing via the use of force, an elongated equally spaced cross-hatch pattern of slots with depths in the range of approximately 10-50% of the relative thickness of the food product. The slicing blades in the slicing blades assembly 12 are shown to possess a straight, linear edged design, however, if desired can be of curved or any other similar edge shape.

Figure 2:
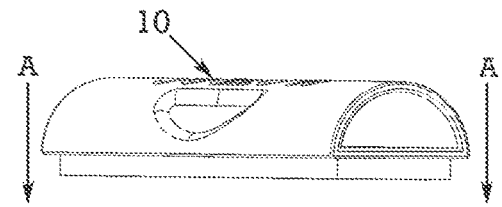
FIG. 2 is a perspective view demonstrating the motion of applying the FOOD SLOTTING DEVICE via directional force to a food product, for example in a vertical downward motion.
Figure 8:
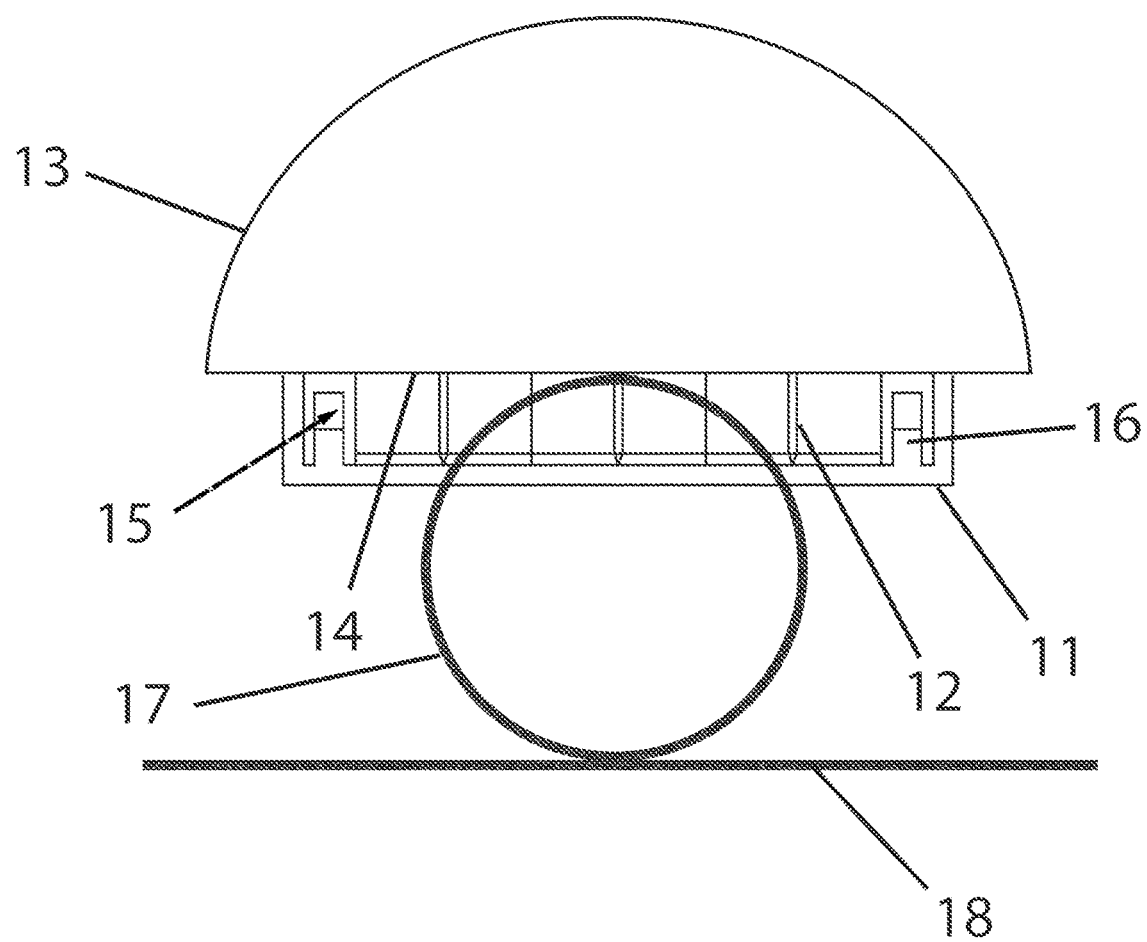

FIG. 2 is a perspective view demonstrating one of the suggested motions regarding the method of effecting partial slots by the applying the FOOD SLOTTING DEVICE 10 through the directional application of force to a food product, in this example, in the downward motion direction of arrowed lines A. The method of the invention comprises placing a generally elongated food product 17 to be partially sliced, such as a hot dog for example (as shown in FIG. 8), onto a flat surface 18, then with the slicing blades assembly 12 component of the FOOD SLOTTING DEVICE 10 contacting the surface of the food product 17, applying directional force downwards, upwards, sideways or horizontally as desired, directly onto the food product 17, with a FOOD SLOTTING DEVICE 10 comprising of a holding unit 13 section with a backing stop member 14 and housing an affixed slicing blades assembly 12 of perpendicular slicing blades extending a sufficient distance from the backing stop member 14 to effect the partial slots in the number and depth as desired by pressing the assembled FOOD SLOTTING DEVICE 10 in the desired direction upon one or multiple longitudinal sides of the food product 17, so as to cause the slicing blades assembly 12 to penetrate the surface, skin, or membrane of the food product to a desired depth, with the backing stop member 14 keeping the slicing blades assembly 12 from cutting completely through the food product 17, creating an elongated equally spaced cross-hatch pattern of slots on the food product 17, and thereafter easily remove the partially sliced food product 17 from the slicing blades assembly 12 of the FOOD SLOTTING DEVICE 10 prior to cooking, grilling, or further processing.

Figure 3:
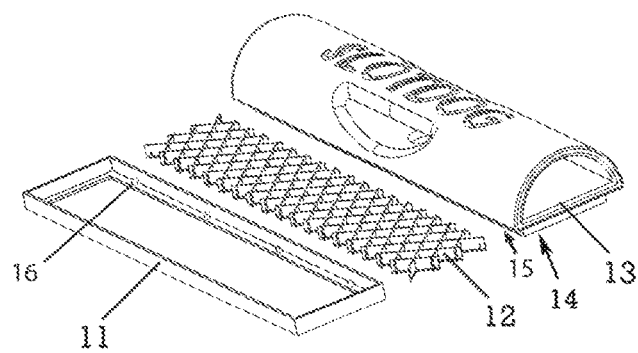
FIG. 3 is an exploded perspective view of the three individual components of the FOOD SLOTTING DEVICE.

FIG. 3 is an exploded perspective view of the three individual components of the FOOD SLOTTING DEVICE: the cover piece 11 which utilizes adhesive and friction to adhere to the holding unit 13 in order to affix the slicing blades assembly 12 in place, slicing blades assembly 12 with a plurality of slicing blades assembled in a perpendicular relation to one another forming an elongated equally spaced cross-hatch pattern, and the holding unit 13. Among other things, FIG. 3 shows post members 16 which extend upwards from the cover piece 11 and securely engage and frictionally fit within mating post holes 15 formed in the holding unit 13 (shown in FIGS. 4, 7 and 8).

Figure 4:
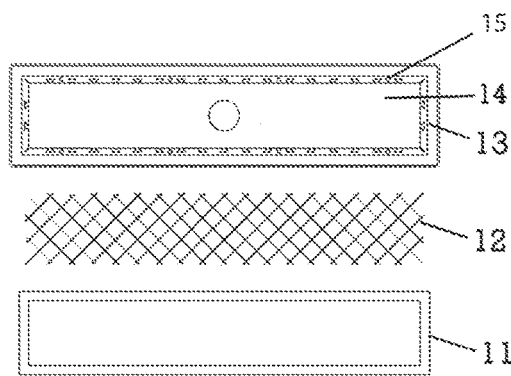
FIG. 4 is an exploded bottom plan view of the three individual components of the FOOD SLOTTING DEVICE.

FIG. 4 is an exploded bottom plan view of the three individual components of the FOOD SLOTTING DEVICE: holding unit 13 with a view of the recessed section (or cavity) created to accommodate the slicing blades assembly 12, with a back portion of said recessed section (or cavity) defining the backing stop member 14, the slicing blades assembly 12 with slicing blades assembled in a perpendicular relation to one another forming an elongated equally spaced cross-hatch pattern, and the cover piece 11 which utilizes a combination of adhesive and friction due to precise fitment to hold the slicing blades assembly 12 in place. Among other things, FIG. 4 shows the post holes 15 which are formed in the holding unit 13 and securely engage, and frictionally fit therewithin, the post members 16 which extend from the cover piece 11 (as can be more readily appreciated in view of FIGS. 6, 7 and 8).

Figure 5:
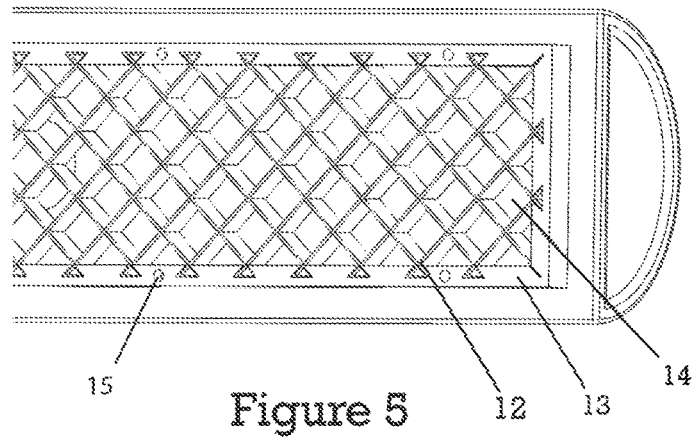
FIG. 5 is an enlarged broken away view of the assembled slicing blades assembly housed within the holding unit.

FIG. 5 is an enlarged broken away view of the slicing blades assembly 12 housed within the holding unit 13, adjacent the backing stop member 14, utilizing the recessed section of the holding unit 13 to create a precise fit, prior to the cover piece 11 being affixed to the holding unit 13 as described.

Figure 6:
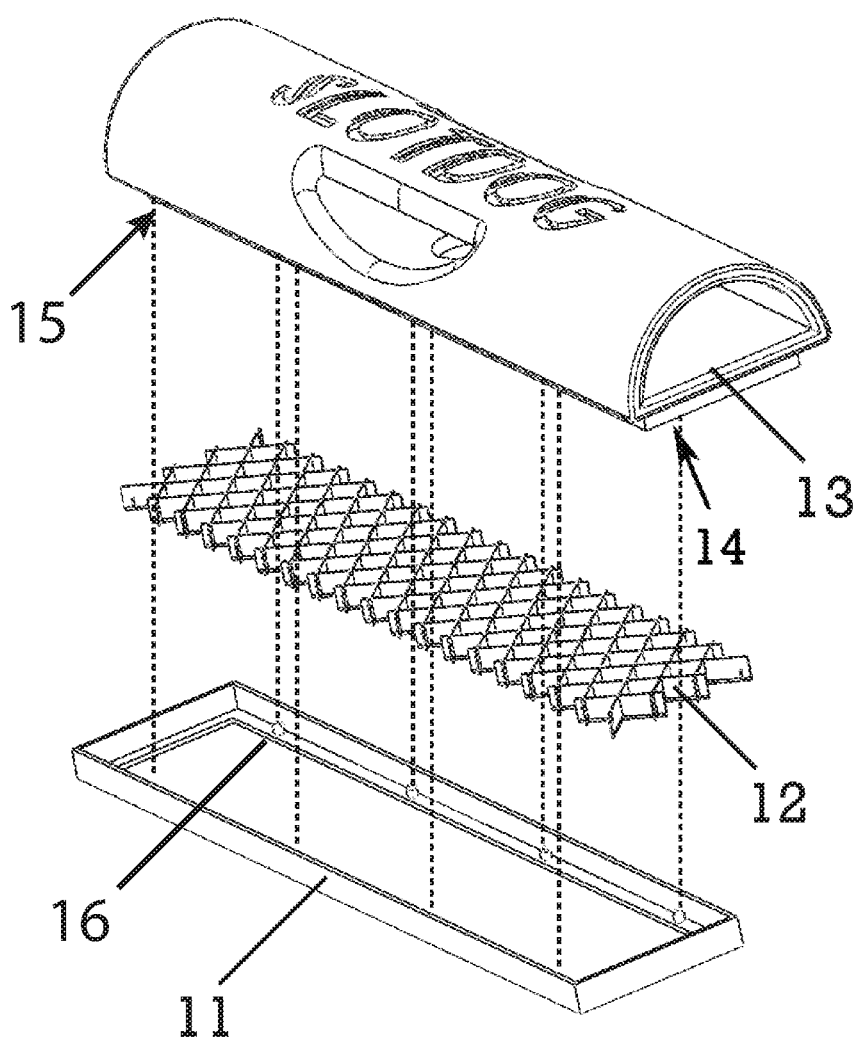
FIG. 6 is an exploded perspective view of the three individual components, aligned for assembly, of the FOOD SLOTTING DEVICE of FIG. 1.

FIG. 6 is an exploded perspective view of the holding unit 13, the slicing blades assembly 12, and the cover piece 11—aligned for assembly together—of the FOOD SLOT- TING DEVICE 10. Phantom guide lines in FIG. 6 extend upwards from the post members 16 on the cover piece 11, passing between blades of the slicing blades assembly 12, towards the mating post holes 15 (not shown in FIG. 6) which are formed in the holding unit 13. As described elsewhere herein, the post members 16 of the cover piece 11 securely engage and frictionally fit within the post holes 15 formed in the holding unit 13 (as shown, for example, in FIG. 8).

Figure 7:
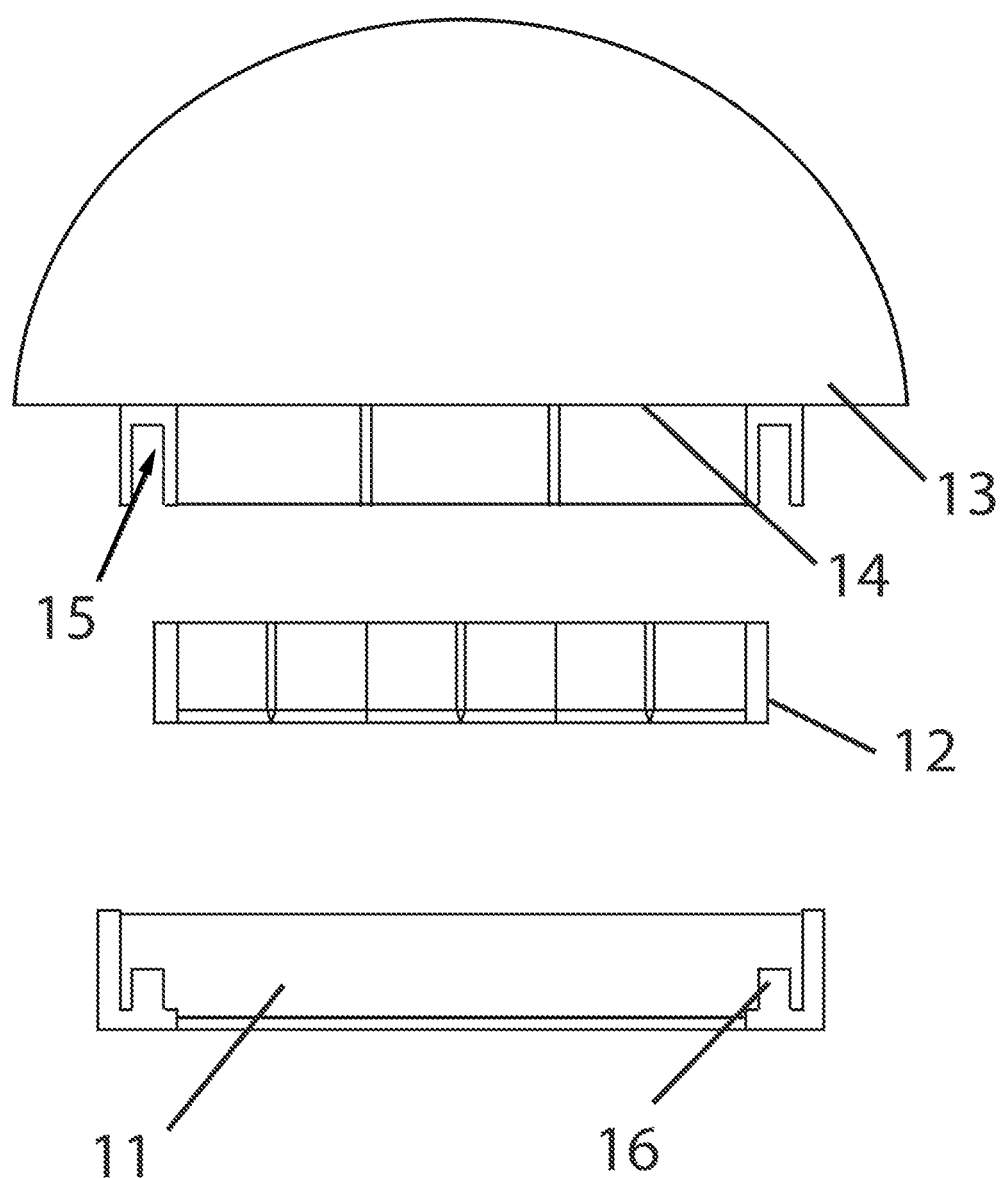
FIG. 7 is an exploded sectional end view of the three individual components, aligned for assembly, of the FOOD SLOTTING DEVICE of FIG. 1. And, FIG. 8 is a sectional end view demonstrating the motion of applying the FOOD SLOTTING DEVICE of FIG. 1 via directional force to a food product, for example in a vertical downward motion.

Similarly, in FIG. 7, the holding unit 13, the slicing blades assembly 12, and the cover piece 11 are together aligned for assembly of the FOOD SLOTTING DEVICE 10. The backing stop member 14, according to the invention, can be seen in FIG. 7 at the back (or top) portion of the recessed section (or cavity) of the holding unit 13. In FIG. 7, the post members 16 on the cover piece 11 are positioned below the mating post holes 15 formed in the holding unit 13. The slicing blades assembly 12 is positioned between the cover piece 11 and the holding unit 13.

As shown in FIG. 8, the slicing blades assembly 12 is securely held between the cover piece 11 and the backing stop member 14 of the holding unit 13. The backing stop member 14 preferably engages and abuts a backing/top portion of the slicing blades assembly, as can be seen in FIG. 8. The post members 16 of the cover piece 11 securely engage and frictionally fit within the post holes 15 formed in the holding unit 13. A combination of adhesive and friction, due to precise fitment, preferably holds the cover piece 11 in place with the holding unit 13. As shown in FIG. 8, the post holes 15 are preferably sized to define a space above the post members 16 to receive an adhesive in this respect.

Ordinarily skilled persons will readily appreciate, in view of the disclosures and teachings herein (including FIG. 8), that a downward directional force can be applied by the FOOD SLOTTING DEVICE 10 to the generally elongated food product 17 (in this example, a hot dog) placed on the flat underlying surface 18. Then, the slicing blades assembly 12 of the FOOD SLOTTING DEVICE 10 directly contacts and slices into the surface of the food product 17. When, as shown in FIG. 8, the backing stop member 14 directly contacts the surface of the food product 17, the slicing blades assembly 12 extends into and effects the partial slots in the food product 17 to the desired depth. The backing stop member 14 then, as shown in FIG. 8, keeps the slicing blades assembly 12 from cutting completely through the food product 17. In this manner, the FOOD SLOTTING DEVICE 10 creates an elongated equally spaced cross-hatch pattern of slots on the food product 17. Thereafter, the partially sliced food product 17 can be readily removed from the slicing blades assembly 12 of the FOOD SLOTTING DEVICE 10 prior to cooking, grilling, or further processing.

The device 10 and method, according to the invention, preferably enable a force to be readily applied by the slicing blades assembly 12 contacting the surface of the hot dog 17 in the downward/vertical motion, normal to the flat stable underlying surface 18 upon which the hot dog 17 has been placed to support the hot dog 17, with the underlying surface 18 effectively providing an equal opposing upward/vertical force. The device 10 and method, according to the invention, preferably can be readily used to provide an equal distribution of force to both elongate sides of the hot dog 17 and, otherwise, reduces the risk of rupture in the hot dog 17 and opportunity for sideways movement of the hot dog 17 during the process. Preferably, according to the invention, the device 10 and method consistently control the maximum depth of cuts by the backstop member 14 which enables the user to create equal cuts of a maximum depth in all thicknesses of hot dogs 17.

The FOOD SLOTTING DEVICE 10 as described may be made entirely of plastic, metal, or any combination of similarly rigid materials as mentioned above, for example a plastic holding unit 13 with metal slicing blades assembly 12 and plastic cover piece 11, or a metal holding unit 13 with metal slicing blades assembly 12 and metal cover piece 11. The slicing blades assembly 12 made of metal, plastic or a similarly rigid material may be affixed within the holding unit 10 by adhesive and/or friction, welded, molded in position, or bent from a portion of the body of the holding unit 13 or similar itself, thus possibly negating the need for a cover piece 11 in some other embodiment situations.

The FOOD SLOTTING DEVICE 10 as illustrated and described provides for a simple to use, cost effective, time efficient, and easily portable device to create perpendicular slots by partially slicing into the body of a generally elongated food product, such as a hot dog, wiener, frankfurter, sausage or the like.

The invention claimed is:

1. A device for partially and stably slicing into one or more surface areas on the body of an article of food, said article of food being generally elongated in nature and having an overall thickness, with the device being for use with a flat stable underlying surface which directly supports the article of food, and the device comprising:
    (a) a holding unit; and
    (b) an assembly of slicing blades;
        wherein said holding unit comprises a cavity designed to receive said assembly of slicing blades, with a back portion of said cavity defining a flat back stop member; wherein the flat back stop member is substantially planar, and the assembly of slicing blades securely engages the flat back stop member, with the assembly of slicing blades extending in a downward direction, normal to the flat back stop member, to a fixed depth relative to the flat back stop member;
        wherein, when said article of food is positioned directly on the flat stable underlying surface, said assembly of slicing blades is adapted to stably slice into said article of food, whatever said overall thickness of said article of food, in said downward direction transverse to said article of food and normal both (i) to said flat back stop member and (ii) to said flat stable underlying surface and, thus, said assembly of slicing blades provides an equal distribution of force to both elongate sides of said article of food; whereby the device maintains an integrity on both elongate sides of said article of food, and maintains both elongate sides of said article of food in place relative to said flat stable underlying surface;
        wherein said flat back stop member is selectively engageable with said article of food and, when the flat back stop member directly contacts said article of food, said assembly of slicing blades then penetrates the surface, skin, or membrane of said article of food and slices into said article of food to a desired depth, with said flat back stop member then keeping the assembly of slicing blades from cutting completely through said article of food;
        wherein said assembly of slicing blades is connected to said holding unit by a cover piece, wherein the cover piece has a plurality of post members which extend in an upward direction, wherein the holding unit is formed and shaped to define mating post holes adapted to securely receive the post members, wherein the post members of the cover piece pass between blades of the assembly of slicing blades, and securely engage and frictionally fit within the mating post holes of the holding unit, and wherein the assembly of slicing blades is positioned and securely held between the cover piece and the flat back stop member of the holding unit; and wherein the flat backstop member is fixed and not movable relative to the holding unit, and the post members of the cover piece extend from a bottom of said cavity, in said upward direction, towards the flat backstop member.

2. The device as recited in claim 1, wherein said holding unit is formed from a rigid material, to which said assembly of slicing blades is connected.

3. A method of using the device as recited in claim 2, for stably slicing into one or more surface areas on the body of an article of food, with said article of food being generally elongated in nature and having an overall thickness; the method comprising the following steps:

(a) placing said article of food directly onto the flat stable underlying surface, such that the flat stable underlying surface supports said article of food;

(b) the assembly of slicing blades of said device contacting the surface of said article of food;

(c) applying force through said device to said article of food causing said assembly of slicing blades to effect stable slices into the surface area of said article of food, whatever said overall thickness of said article of food, in a direction transverse to said article of food and normal both (i) to said flat back stop member and (ii) to said flat stable underlying surface and, thus, said assembly of slicing blades provides an equal distribution of force to both elongate sides of said article of food; whereby the device maintains an integrity on both elongate sides of said article of food, and maintains both elongate sides of said article of food in place relative to said flat stable underlying surface; with said assembly of slicing blades penetrating the surface, skin, or membrane of said article of food to a desired depth, and with said flat back stop member selectively engaging said article of food and, when the flat stop member directly contacts said article of food, said flat back stop member and said fixed depth relative to the flat back stop member together then keep and prevent the assembly of slicing blades from cutting completely through said article of food independent of said force that is applied to slice into said article of food to said desired depth; and (d) separating said article of food from said assembly of slicing blades of said device for cooking, heating, or further processing.

4. The method as recited in claim 3, wherein said device is applied to one or multiple longitudinal sides of said article of food.

5. The method as recited in claim 3, wherein a cross-hatch pattern of slices equally referred to as slots is created in the body of said article of food.

6. The method as recited in claim 3 wherein, in step (d), said device is readily removed from said article of food, by hand, with said assembly of slicing blades also being readily dislodged and separated from said article of food.

7. The device as recited in claim 1, wherein said assembly of slicing blades comprises a plurality of individual slicing blades formed from a rigid material.

8. The device as recited in claim 1, wherein said assembly of slicing blades comprises a plurality of individual slicing blades assembled in such a manner as to create a cross-hatched pattern of slicing blades.

9. The device as recited in claim 1, wherein said assembly of slicing blades is connected to said holding unit by the presence of friction existing between said holding unit and said assembly of slicing blades.

10. The device as recited in claim 1, wherein said assembly of slicing blades is connected to said holding unit by a cover piece through the presence of friction existing between said holding unit and said cover piece.

11. The device as recited in claim 1, wherein said assembly of slicing blades is connected to said holding unit by a cover piece through the presence of adhesive applied to opposing surfaces of said holding unit and said cover piece.

12. The device as recited in claim 1, wherein said assembly of slicing blades is connected to said holding unit by welding said assembly of slicing blades to said holding unit.

13. The device as recited in claim 1, wherein said assembly of slicing blades is molded or bent from a portion of the body of said holding unit.

14. The device as recited in claim 1, wherein said assembly of slicing blades and said holding unit are formed together as a single entity.

15. A method of using the device as recited in claim 1, for stably slicing into one or more surface areas on the body of an article of food, with said article of food being generally elongated in nature and having an overall thickness; the method comprising the following steps:

(a) placing said article of food directly onto the flat stable underlying surface, such that the flat stable underlying surface supports said article of food;

(b) the assembly of slicing blades of said device contacting the surface of said article of food;

(c) applying force through said device to said article of food causing said assembly of slicing blades to effect stable slices into the surface area of said article of food, whatever said overall thickness of said article of food, in a direction transverse to said article of food and normal both (i) to said flat back stop member and (ii) to said flat stable underlying surface and, thus, said assembly of slicing blades provides an equal distribution of force to both elongate sides of said article of food; whereby the device maintains an integrity on both elongate sides of said article of food, and maintains both elongate sides of said article of food in place relative to said flat stable underlying surface; with said assembly of slicing blades penetrating the surface, skin, or membrane of said article of food to a desired depth, and with said flat back stop member selectively engaging said article of food and, when the flat stop member directly contacts said article of food, said flat back stop member and said fixed depth relative to the flat back stop member together then keep and prevent the assembly of slicing blades from cutting completely through said article of food independent of said force that is applied to slice into said article of food to said desired depth; and (d) separating said article of food from said assembly of slicing blades of said device for cooking, heating, or further processing.

16. The method as recited in claim 15, wherein said device is applied to one or multiple longitudinal sides of said article of food.

17. The method as recited in claim 15, wherein a cross-hatch pattern of slices equally referred to as slots is created in the body of said article of food.

18. The method as recited in claim 15 wherein, in step (d), said device is readily removed from said article of food, by hand, with said assembly of slicing blades also being readily dislodged and separated from said article of food.

19. The method as recited in claim 15 wherein, before step (b), said assembly of slicing blades is connected to said holding unit by a cover piece, wherein the cover piece has a plurality of post members which extend in an upward direction, wherein the holding unit is formed and shaped to define mating post holes adapted to securely receive the post members, wherein the post members of the cover piece pass between blades of the assembly of slicing blades, and securely engage and frictionally fit within the mating post holes of the holding unit, and wherein the assembly of slicing blades is positioned and securely held between the cover piece and the flat back stop member of the holding unit.

\* \* \* \* \*